United States Patent
Yamamoto et al.

(10) Patent No.: US 8,133,405 B2
(45) Date of Patent: Mar. 13, 2012

(54) SPINEL-TYPE FERRIMAGNETIC PARTICLES, PROCESS FOR PRODUCING THE SAME, AND MAGNETIC RECORDING MEDIUM USING THE SAME

(75) Inventors: Hiroshi Yamamoto, Suginami-ku (JP); Tsutomu Katamoto, Ohtake (JP)

(73) Assignee: Toda Kogyo Corporation, Otake-shi, Hiroshima-ken (JP)

( * ) Notice: Subject to any disclaimer, the term of this patent is extended or adjusted under 35 U.S.C. 154(b) by 125 days.

(21) Appl. No.: 12/662,956

(22) Filed: May 13, 2010

(65) Prior Publication Data

US 2010/0227048 A1    Sep. 9, 2010

Related U.S. Application Data

(62) Division of application No. 11/062,738, filed on Feb. 23, 2005, now abandoned.

(51) Int. Cl.
| | |
|---|---|
| *H01F 1/36* | (2006.01) |
| *C04B 35/26* | (2006.01) |
| *C04B 35/28* | (2006.01) |
| *C04B 35/30* | (2006.01) |
| *C04B 35/32* | (2006.01) |
| *C04B 35/34* | (2006.01) |
| *C04B 35/36* | (2006.01) |
| *C04B 35/38* | (2006.01) |

(52) U.S. Cl. .............. 252/62.56; 252/62.62; 252/62.58; 252/62.59

(58) Field of Classification Search ............... 252/62.62, 252/62.56, 62.58, 62.59
See application file for complete search history.

(56) References Cited

U.S. PATENT DOCUMENTS

| | | | |
|---|---|---|---|
| 5,098,773 A | 3/1992 | Saito et al. | |
| 5,728,454 A | 3/1998 | Inaba et al. | |
| 6,764,608 B2 * | 7/2004 | Yamamoto et al. | 252/62.56 |
| 7,208,134 B2 | 4/2007 | Bromberg et al. | |
| 7,285,329 B2 | 10/2007 | Kaneko et al. | |
| 7,399,523 B2 * | 7/2008 | Yamamoto et al. | 428/329 |
| 2003/0183800 A1 * | 10/2003 | Yamamoto et al. | 252/62.54 |
| 2004/0096702 A1 | 5/2004 | Saito et al. | |
| 2004/0216810 A1 | 11/2004 | Iwasaki et al. | |
| 2006/0141139 A1 | 6/2006 | Iorio et al. | |

FOREIGN PATENT DOCUMENTS

| | | | |
|---|---|---|---|
| WO | WO 02/36174 | * | 5/2002 |
| WO | WO 2004/100190 | * | 11/2004 |

* cited by examiner

*Primary Examiner* — Carol M Koslow
(74) *Attorney, Agent, or Firm* — Nixon & Vanderhye P.C.

(57) ABSTRACT

Spinel-type ferrimagnetic particles having a composition represented by the formula:

$$(MO) \cdot n/2(Fe_2O_3)$$

where M is a divalent metal and n is a molar ratio of Fe to M (n=Fe/M) which is from more than 2.05 to less than 2.5 (2.05<n<2.5). They contain a superparamagnetic component in an amount of not more than 2% by mass, has an average particle diameter of 5 to 30 nm. The particles are respectively coated on surface with a hydroxide of at least one metal Si, Al, P and Zn in an amount of not more than 10% by mass, calculated as the metal. The spinel-type ferrimagnetic particles can exhibit a high coercive force irrespective of fine particles, and are excellent in dispersibility and chemical stability, as well as the magnetic recording medium for high-density recording can exhibit not only excellent frequency characteristics and high output characteristics, but also an excellent weather resistance and a high reliability.

6 Claims, No Drawings

SPINEL-TYPE FERRIMAGNETIC PARTICLES, PROCESS FOR PRODUCING THE SAME, AND MAGNETIC RECORDING MEDIUM USING THE SAME

CROSS REFERENCE TO RELATED APPLICATION

This application is a divisional of application Serial No. 11/062,738 filed Feb. 23, 2005, now abandoned, entire content of which is hereby incorporated by reference in this application.

BACKGROUND OF THE INVENTION

1. Field of the Invention

The present invention relates to spinel-type ferrimagnetic particles, a process for producing the spinel-type ferrimagnetic particles, and a magnetic recording medium using the spinel-type ferrimagnetic particles. More particularly, the present invention relates to spinel-type ferrimagnetic particles which can exhibit a high coercive force irrespective of fine particles, especially fine particles having an average particle size of 5 to 30 nm, and are excellent in chemical stability and dispersibility; a process for producing the spinel-type ferrimagnetic particles; and a magnetic recording medium using the spinel-type ferrimagnetic particles.

2. Prior Arts

With recent demands for high performance and high-density recording of magnetic recording media such as magnetic tapes, there have been used such magnetic recording media having a high coercive force (Hc), i.e., exhibiting excellent magnetic properties. The magnetic properties of the magnetic recording media have a close relationship with reliability but also an improved weather resistance. Therefore, it has been required to further improve properties of the spinel-type ferrimagnetic particles.

DISCLOSURE OF THE INVENTION

Problem to be Solved by the Invention

The present invention has been conducted for solving the above conventional problems. A first object of the present invention is to provide spinel-type ferrimagnetic particles exhibiting not only a high coercive force irrespective of fine particles, but also excellent dispersibility and chemical stability.

A second object of the present invention is to provide a magnetic recording medium for high-density recording, which exhibits not only excellent frequency characteristics and high output characteristics, but also an excellent weather resistance and a high reliability.

Means for Solving Problem

As a result of the present inventors' earnest studies, it has been found that the spinel-type ferrimagnetic particles comprising iron and a divalent metal, which contain a superparamagnetic component in a specific amount, are coated on the surface thereof with a specific hydroxide, and have an average particle diameter of not more than 30 nm, can exhibit not only a high coercive force irrespective of fine particles, but also excellent dispersibility and chemical stability. The present invention has been attained on the basis of the above finding.

To accomplish the aims, in a first aspect of the present invention, there are provided spinel-type ferrimagnetic particles having a composition represented by the formula:

$$(MO) \cdot n/2(Fe_2O_3)$$

wherein M is a divalent metal; and n is a molar ratio of Fe to M (n=Fe/M) which is from more than 2.05 to less than 2.5 (2.05<n<2.5), containing a superparamagnetic component in an amount of not more than 2% by mass, and having an average particle diameter of 5 to 30 nm, the spinel-type ferrimagnetic particles being respectively coated on surface thereof with a hydroxide of at least one metal selected from the group consisting of Si, Al, P and Zn in an amount of not more than 10% by mass, calculated as the metal.

In a second aspect of the present invention, there is provided a process for producing the spinel-type ferrimagnetic particles as defined in the above first aspect, comprising:

a preparation step for a raw aqueous solution of mixing an aqueous iron (Fe)-containing solution and an aqueous divalent metal (M)-containing solution with each other such that a molar ratio of Fe to M is in the range of from more than 2.05 to less than 2.5 (2.05<Fe/M<2.5);

a production step for a co-precipitate-containing solution of adding an aqueous alkali solution to the raw aqueous solution at a temperature of from 60° C. to less than 110° C. so as to adjust a concentration of alkali in the raw aqueous solution to 0.05 to 10 M;

a production step for black particles of heat-treating the co-precipitate-containing solution at a temperature of 80 to 120° C.;

an etching step for the black particles of washing the black particles to remove the alkali therefrom, and adding an acid thereto to remove a superparamagnetic component therefrom; and a coating step for a hydroxide of the metal of subjecting the resultant solution containing the etched black particles to filtration and washing, and then adding an aqueous solution containing at least one metal selected from the group consisting of Si, Al, P and Zn to the resultant solution containing the washed black particles to form a coating layer composed of a hydroxide of the metal on the surface of the respective black particles.

In a third aspect of the present invention, there is provided a magnetic recording medium comprising a non-magnetic substrate and a magnetic layer formed on the non-magnetic substrate, the magnetic layer comprising the spinel-type ferrimagnetic particles as defined in the above first aspect and a binder.

PREFERRED EMBODIMENT FOR CARRYING OUT THE INVENTION

The present invention is described in detail below.

First, the spinel-type ferrimagnetic particles of the present invention are described. The spinel-type ferrimagnetic particles of the present invention have a composition represented by the formula:

$$(MO) \cdot n/2(Fe_2O_3)$$

(wherein M is a divalent metal; and n is a molar ratio of Fe to M (n=Fe/M) which is from more than 2.05 to less than 2.5 (2.05<n<2.5)); contain a superparamagnetic component in an amount of not more than 2% by mass, have an average particle diameter of 5 to 30 nm; and have on the respective surface thereof a coating layer composed of a hydroxide of at least one metal selected from the group consisting of Si, Al, P and Zn in an amount of not more than 10% by mass, calculated as the metal.

The spinel-type ferrimagnetic particles of the present invention have a composition represented by the formula: (MO).n/2(Fe$_2$O$_3$). In the formula, M represents a divalent metal, more specifically at least two metals selected from the group consisting of Co, Ni, Zn and Mn. The molar ratio (n=Fe/M) is the value which is larger than a stoichiometric amount of spinel-type ferrite, concretely 2.05<n<2.5. In the consideration of further enhancement of the coercive force of the spinel-type ferrimagnetic particles, the molar ratio is preferably 2.10≦n≦2.48.

When the molar ratio (n=Fe/M) is in the range of from more than 2.05 to less than 2.5, the resultant spinel-type ferrimagnetic particles are constituted of one (single) phase. However, when the molar ratio n is not more than 2.05, magnetic particles having two phases or particles having mixed different phases tend to be produced. When the molar ratio n is not less than 2.5, particles in which iron oxide such as iron oxide hydroxide is mixed, tend to be produced. The two-phase magnetic particles, the particles having mixed different phases, or the particles in which iron oxide is mixed, tend to be deteriorated in magnetic properties required for magnetic materials, so that it may be difficult to accomplish the aimed objects of the present invention.

As the divalent metal contained in the spinel-type ferrimagnetic particles of the present invention, preferred are at least two metals selected from the group consisting of Co, Ni and Mn. For example, there are exemplified spinel-type ferrimagnetic particles having a composition represented by the formula:

(CoO)$_x$(NiO)$_y$(MnO)$_z$·n/2(Fe$_2$O$_3$).

In the above formula, the molar ratio (n=Fe/M) is in the range of usually 2.05<n<2.5, preferably 2.09<n<2.40; x is in the range of usually 0.4<x<0.6, preferably 0.42<x<0.58; y is in the range of usually 0.3<y<0.5, preferably 0.32<y<0.48; and z is in the range of usually 0.02<z<0.2), preferably 0.03<z<0.18, with the proviso that a sum of x, y and z is 1 (x+Y+z=1).

The spinel-type ferrimagnetic particles of the present invention contain the superparamagnetic component in an amount of not more than 2% by mass, preferably not more than 1% by mass. When the content of the superparamagnetic component is more than 2% by mass, the magnetization condition of the spinel-type ferrimagnetic particles may vary depending upon the strength of an ambient magnetic field, thereby failing to maintain a stable magnetization thereof. Meanwhile, the "superparamagnetic component" used herein means a substance which is especially strongly magnetized when placed in a paramagnetic material, and it is expected that the component is composed of a hydroxide containing Fe as well as Co, Ni, Zn and/or Mn.

The spinel-type ferrimagnetic particles of the present invention have an average particle diameter of 5 to 30 nm, preferably 9 to 25 nm, more preferably 10 to 20 nm. When the average particle diameter of the spinel-type ferrimagnetic particle is less than 5 nm, the saturation magnetization value thereof tends to be lowered, so that the resultant spinel-type ferrimagnetic particles tends to be insufficient in properties required for magnetic materials. When the average particle diameter of the spinel-type ferrimagnetic particles is more than 30 nm, the magnetic recording medium produced using such spinel-type ferrimagnetic particles tends to be increased in noise due to particles.

The respective spinel-type ferrimagnetic particles are coated on the surface thereof with a hydroxide of at least one metal selected from the group consisting of Si, Al, P and Zn. Of these hydroxides, preferred are hydroxides of Si and/or Al. The amount of the hydroxide is not more than 10% by mass, preferably not more than 5% by mass, more preferably 0.01 to 1.0% by mass (calculated as the metal ion) based on the magnetic particles. When the surface of the respective spinel-type ferrimagnetic particles is coated with the hydroxide of at least one metal selected from the group consisting of Si, Al, P and Zn, the surface condition of the respective particles can be improved, resulting in improved dispersibility and oxidation stability of the spinel-type ferrimagnetic particles in a vehicle upon production of the magnetic recording medium.

When the spinel-type ferrimagnetic particles are not coated with the hydroxide of metal, i.e., the amount of the hydroxide coated is zero, the spinel-type ferrimagnetic particles tend to be deteriorated in dispersibility in the vehicle. When the amount of the hydroxide coated is more than 10% by mass, the amount of magnetic substances contained in the magnetic particles tends to be decreased, resulting in poor magnetic properties thereof, so that it may be difficult to accomplish the aimed objects of the present invention.

The spinel-type ferrimagnetic particles have a coercive force of usually 159.2 to 318.4 kA/m (2000 to 4000 Oe), preferably 199 to 278.6 kA/m (2500 to 3500 Oe). When the coercive force of the spinel-type ferrimagnetic particles is less than 159.2 kA/m, the resultant particles tend to be insufficient in properties required for magnetic materials, so that it may be difficult to obtain a magnetic recording medium for high-density recording which exhibits a high image definition and quality. Meanwhile, in the present invention, conversion in units of the coercive force is made according to the formula: 1 Oe=10$^3$/4 πA/m (wherein π represents a ratio of the circumference of a circle to its diameter).

The spinel-type ferrimagnetic particles of the present invention have a saturation magnetization value σs of usually 40 to 70 Am$^2$/kg (40 to 70 emu/g), preferably 45 to 70 Am$^2$/kg (45 to 70 emu/g); and a squareness (σr/σs) of usually 0.51 to 0.69, preferably 0.55 to 0.69. When the saturation magnetization value σs of the spinel-type ferrimagnetic particles is less than 40 Am$^2$/kg, the resultant particles tend to be insufficient in magnetic properties required for magnetic materials, so that it may be difficult to obtain a magnetic recording medium for high-density recording which exhibits a high image definition and quality. Meanwhile, in the present invention, conversion in units of the saturation magnetization value is made according to the formula: 1 emu/g=4π×10$^{-7}$ Wb·m/kg (wherein π represents a ratio of the circumference of a circle to its diameter).

The spinel-type ferrimagnetic particles of the present invention have a soluble Na content of usually not more than 100 ppm, preferably not more than 70 ppm, more preferably not more than 50 ppm; and a soluble Ca content of usually not more than 100 ppm, preferably not more than 80 ppm, more preferably not more than 70 ppm. When the soluble Na content or the soluble Ca content is more than 100 ppm, the obtained magnetic coating film tends to suffer from deposition of compounds derived from these substances, so that it may be difficult to accomplish the aimed objects of the present invention.

In addition, the spinel-type ferrimagnetic particles of the present invention contain residual sulfur in an amount of usually not more than 200 ppm, preferably not more than 100 ppm. When the amount of residual sulfur in the particles is more than 200 ppm, the bleed-out of sulfur tends to be caused on the surface of the resultant magnetic coating film, resulting in deterioration of a magnetic head, so that it may be difficult to accomplish the aimed objects of the present invention.

Next, the process for producing the spinel-type ferrimagnetic particles according to the present invention is described. The production process of the spinel-type ferrimagnetic particles according to the present invention comprises the steps of:

(1) mixing an aqueous iron (Fe)-containing solution and an aqueous divalent metal (M)-containing solution with each other at a molar ratio of Fe to M of from more than 2.05 to less than 2.5 (2.05<Fe/M<2.5) to prepare a raw aqueous solution;

(2) adding an aqueous alkali solution to the raw aqueous solution at a temperature of from 60° C. to less than 110° C. so as to adjust an alkali concentration in the raw aqueous solution to 0.05 to 10 M, thereby producing a co-precipitate-containing solution;

(3) heat-treating the obtained co-precipitate-containing solution at a temperature of 80 to 120° C. to produce black particles;

(4) after washing the black particles to remove the alkali therefrom, adding an acid thereto to remove a superparamagnetic component therefrom and etch the black particles; and (5) after subjecting the solution containing the etched black particles to filtration and washing, adding an aqueous solution containing at least one metal selected from the group consisting of Si, Al, P and Zn to the solution containing the washed black particles to form a coating layer composed of a hydroxide of the metal on the surface of the respective black particles.

First, in the step (1) for preparation of the raw aqueous solution, a water-soluble iron salt and a water-soluble salt of M (divalent metal), for examples, at least two metals selected from the group consisting of Co, Ni, Zn and Mn as raw materials are respectively dissolved in water to prepare an aqueous solution containing $Fe^{3+}$ at a predetermined concentration and an aqueous solution containing $M^{2+}$ ($Co^{2+}$, $Ni^{2+}$, $Zn^{2+}$ and $Mn^{2+}$) at a predetermined concentration. The respective aqueous solutions are mixed with each other at the molar ratio (n=Fe/M) of 2.05<n=Fe/M<2.5, thereby obtaining the raw aqueous solution.

The metal ion concentrations in the above respective aqueous solutions are not particularly limited, and there may be prepared aqueous solutions having ordinary metal ion concentrations. Also, the temperature of the respective aqueous solutions are not particularly limited unless the metals dissolved therein are precipitated.

Examples of the raw iron materials used in the present invention may include ferric salts such as ferric chloride, ferric sulfate, or the like. Examples of the raw cobalt materials may include cobalt chloride, cobalt sulfate or the like. Examples of the raw nickel materials may include nickel chloride, nickel sulfate or the like. Examples of the raw zinc materials may include zinc chloride, zinc sulfate or the like. Examples of the raw manganese materials may include manganese chloride, manganese sulfate or the like.

In the step (2) for production of the co-precipitate-containing solution, the aqueous alkali solution is added to the resultant mixed aqueous solution at a temperature of from 60° C. to less than 110° C., preferably from 80 to 100° C. under stirring to adjust the alkali concentration in the mixed aqueous solution to 0.05 to 10 M(mol), preferably 0.2 to 5 M(mol), thereby producing the co-precipitate-containing solution.

When the alkali concentration is less 0.05 M(mol), the crystallization of the spinel-type ferrimagnetic particles tends to become incomplete. Also, when the alkali concentration is more 10 M(mol), the spinel-type ferrimagnetic particles tend to be considerably deteriorated in coercive force.

The metal ion concentration in the co-precipitate-containing solution is in the range of usually 0.05 to 0.5 M(mol), preferably 0.1 to 0.4 M(mol). When the metal ion concentration in the co-precipitate-containing solution is less than 0.05 M(mol), the concentration of the co-precipitate in the solution tends to be too small, resulting in economically disadvantageous process. When the metal ion concentration in the co-precipitate-containing solution is more than 0.5 M(mol), the obtained spinel-type ferrimagnetic particles tend to have a too broad particle size distribution, so that it may be difficult to accomplish the aimed objects of the present invention.

When the temperature of the mixed aqueous solution is less than 60° C., the particle size of the co-precipitate produced tends to be too large, so that it may be difficult to accomplish the aimed objects of the present invention. When the temperature of the mixed aqueous solution is not less than 110° C., the use of a special apparatus such as an autoclave tends to be required, resulting in economically disadvantageous process.

Examples of the alkali used may include water-soluble alkalis such as sodium hydroxide, potassium hydroxide and aqueous ammonia.

The concentration of the aqueous alkali solution added is not particularly limited, and there may be used aqueous alkali solutions having ordinary concentrations. In addition, the temperature of the aqueous alkali solution is not particularly limited unless the temperature of the mixed solution prepared after addition thereof is out of the above-specified range, i.e., from 60° C. to less than 110° C.

In the step (3) for production of the black particles, the thus obtained co-precipitate-containing solution is heat-treated at a temperature of 80 to 120° C., preferably 90 to 100° C. for usually 1 to 5 hours, preferably 1 to 3 hours, thereby producing the black particles.

In the above heat treatment, the co-precipitate obtained in the step (2) for production of the co-precipitate-containing solution is subjected to polycondensation reaction to produce the black particles.

In the step (4) for etching the surface of the black particles, the thus obtained black particles are washed to remove alkalis therefrom, and then acid is added to the particles to remove the superparamagnetic component therefrom.

The washing with the alkali solution is a step for efficiently conducting the subsequent acid etching treatment, and usually conducted by a decantation method. The decantation method is not particularly limited, and there may be employed known methods using known apparatuses.

The alkali concentration in the black particle-containing solution obtained after the above washing treatment is usually less than 0.01 M(mol), preferably not more than 0.001 M(mol). When the alkali concentration in the black particle-containing solution obtained after the above washing treatment is not less than 0.01 M(mol), the amount of the acid used in the etching treatment tends to be increased, resulting in economically disadvantageous process.

In the method for acid-etching the black particles, for example, the acid is added in such an equivalent amount corresponding to usually 5 to 70 mol %, preferably 15 to 50 mol % based on moles of the metal ion contained in the black particles. The etching temperature is usually 5 to 90° C., preferably 20 to 50° C. The etching time is usually 1 to 48 hours, preferably 2 to 20 hours. Examples of the acid added may include hydrochloric acid, sulfuric acid, nitric acid, oxalic acid or the like. The method for adding the acid is not particularly limited, and the acid may be added, for example, at one time or sequentially.

When the equivalent amount of the acid added is less than 5 mol %, the amount of the residual superparamagnetic component tends to become increased, so that it may be difficult to accomplish the aimed objects of the present invention. When the equivalent amount of the acid added is more than 70 mol %, the resultant particles tend to be deteriorated in magnetic properties, resulting in economically disadvantageous process.

In the step (5) for coating with the metal hydroxide on the surface of the particles, the thus etched black particles are subjected to filtration and washing, and then treated with an aqueous solution containing at least one metal selected from the group consisting of Si, Al, P and Zn to form the coating layer composed of the metal hydroxide on the surface thereof.

Since the black particle-containing solution obtained after the step (4) for etching the surface of the black particles contains soluble metal salts, etc., the black particles are washed to remove the soluble metal salts, etc., therefrom. As the washing method, there may be usually used a decantation method or a water-flowing type washing method. The decantation method or the water-flowing type washing method is not particularly limited, and there may be used known methods using known apparatuses.

The black-particle-containing solution obtained after the washing treatment has an electric conductivity of usually less than 500 μS/cm, preferably not more than 100 μS/cm. When the electric conductivity of the black-particle-containing solution obtained after the washing treatment is not less than 500 μS/cm, the content of the soluble metal ions in the solution tends to be too large, so that it may be difficult to accomplish the aimed objects of the present invention.

Next, the washed black particles are coated with the hydroxide of at least one metal selected from the group consisting of Si, Al, P and Zn. As the coating method, there may be used such a method of adding an aqueous solution containing a water-soluble salt of the above metal to the solution containing the washed black particles under stirring to prepare a slurry of the black particles, and then adding an aqueous alkali solution to the slurry of the black particles at a temperature of 20 to 100° C. The amount of the metal hydroxide coated is in the range of usually 0.2 to 10% by mass, preferably 0.5 to 5% by mass based on the black particles. When the amount of the coating layer composed of the metal hydroxide is less than 0.2% by mass, the resultant particles tend to be deteriorated in dispersibility and resin absorbing capability upon producing a magnetic coating composition therefrom. When the amount of the metal hydroxide is more than 10% by mass, the content of magnetic substances in the resultant magnetic particles tends to be too small, resulting in poor magnetic properties thereof, so that it may be difficult to accomplish the aimed object of the present invention.

Examples of the silicon compounds may include water-soluble silicon salts such as sodium silicate and potassium silicate, or the like. Examples of the aluminum compounds may include water-soluble aluminum salts such as aluminum sulfate and sodium aluminate, or the like. Examples of the phosphorus compounds may include water-soluble phosphorus salts such as disodium hydrogenphosphate and orthophosphoric acid, or the like. Examples of the zinc compounds may include water-soluble zinc salts such as zinc chloride and zinc sulfate, or the like. Examples of the alkalis may include water-soluble alkali salts such as sodium hydroxide, potassium hydroxide and aqueous ammonia, or the like.

After the coating treatment, the resultant particles are filtered, washed with water and then dried, thereby obtaining spinel-type ferrimagnetic particles. As the washing method, there may be used ordinary water-flowing methods. The drying temperature is in the range of usually 60 to 150° C., preferably 80 to 120° C. The drying time is in the range of usually 4 to 20 hours.

Meanwhile, a magnetic coating film obtained using the thus produced spinel-type ferrimagnetic particles by the below-mentioned method has a coercive force Hc of usually 159.2 to 318.4 kA/m (2000 to 4000 Oe), preferably 199 to 278.6 kA/m (2500 to 3500 Oe); and a squareness (Br/Bm) of usually not less than 0.55, preferably not less than 0.60.

Next, the magnetic recording medium of the present invention is described. The magnetic recording medium of the present invention comprises a non-magnetic substrate, and a magnetic recording layer formed on the non-magnetic substrate, which is composed of the above spinel-type ferrimagnetic particles and a binder resin.

Examples of the non-magnetic substrate may include films composed of synthetic resins which are generally used for magnetic recording media, such as polyethylene terephthalate, polyethylene, polypropylene, polycarbonates, polyethylene naphthalate, polyamides, polyamideimides and polyimides, foils or plates of metals such as aluminum and stainless steel, and various papers. The thickness of the non-magnetic substrate may vary depending upon materials thereof, and is in the range of usually 1.0 to 300 μm, preferably 2.0 to 50 μm.

For example, in the case of magnetic disks, there may be used the non-magnetic substrate composed of polyethylene terephthalate and having a thickness of usually 50 to 300 μm. As the non-magnetic substrate of the magnetic tapes, in the case of using polyethylene terephthalate, the thickness thereof is usually 3 to 100 μm, in the case of using polyethylene naphthalate, the thickness thereof is usually 3 to 50 μm, and in the case of using polyamides, the thickness thereof is usually 2 to 10 μm.

As the binder resin, there may be used such resins as currently generally used for production of magnetic recording media. Examples of the binder resin may include vinyl chloride-vinyl acetate copolymers, urethane resins, vinyl chloride-vinyl acetate-maleic acid copolymers, urethane elastomers, butadiene-acrylonitrile copolymers, polyvinyl butyral, cellulose derivatives such as nitrocellulose, polyester resins, synthetic rubber-based resins such as polybutadiene, epoxy resins, polyamide resins, polyisocyanate, electron beam-curing type acrylic urethane resins, and mixtures thereof.

Also, these binder resins may contain polar groups such as —OH, —COOH, —SO$_3$X, —OPO$_2$X$_2$ and —NH$_2$, wherein X represents H, Na or K.

The magnetic recording layer has a coating film thickness of usually 0.01 to 5.0 μm. When the coating film thickness of the magnetic recording layer is less than 0.01 μm, it may be difficult to form a uniform coating film, resulting in unevenness of coating, etc. When the coating film thickness of the magnetic recording layer is more than 5.0 μm, it may be difficult to attain a good signal recording property owing to adverse influence of demagnetization field.

The blending ratio between the spinel-type ferrimagnetic particles and the binder resin may be adjusted such that the spinel-type ferrimagnetic particles are contained in an amount of usually 5 to 2000 parts by weight based on 100 parts by weight of the binder resin.

Meanwhile, the magnetic recording layer may also contain known additives generally used in magnetic recording media such as lubricants, abrasives and antistatic agents in an amount of usually 0.1 to 50 parts by weight based on 100 parts by weight of the binder resin.

The magnetic recording medium of the present invention has a coercive force Hc of usually 159.2 to 318.4 kA/m (2000 to 4000 Oe), preferably 199 to 278.6 kA/m (2500 to 3500 Oe); a squareness (Br/Bm) of usually not less than 0.55, preferably not less than 0.60; an orientation degree of usually not less than 1.05, preferably not less than 1.1; and a surface roughness Ra of usually not more than 18 nm, preferably not more than 15 nm.

In the magnetic recording medium of the present invention, a non-magnetic undercoat layer composed of non-magnetic particles and a binder resin may be formed between the non-magnetic substrate and the magnetic recording layer. The thickness of the non-magnetic undercoat layer is usually in the range of 0.2 to 10.0 μm. When the thickness of the non-magnetic undercoat layer is less than 0.2 μm, it may be difficult to improve the surface roughness of the non-magnetic substrate.

As the non-magnetic particles contained in the non-magnetic undercoat layer, there may be employed non-magnetic inorganic particles used in an ordinary non-magnetic undercoat layer for magnetic recording media. Specific examples of the non-magnetic particles may include hematite, iron oxide hydroxide, titanium oxide, zinc oxide, tin oxide, tungsten oxide, silicon dioxide, α-alumina, β-alumina, γ-alumina, chromium oxide, cerium oxide, silicon carbide, titanium carbide, silicon nitride, boron nitride, calcium carbonate, barium carbonate, magnesium carbonate, strontium carbonate, calcium sulfate, barium sulfate, molybdenum disulfide and barium titanate. These non-magnetic inorganic particles may be used singly or in the combination of any two or more thereof. Of these non-magnetic inorganic particles, preferred are hematite, iron oxide hydroxide and titanium oxide.

Meanwhile, in order to improve a dispersibility of these non-magnetic particles in a vehicle upon production of a non-magnetic coating composition, the surface of the non-magnetic particles may be treated with hydroxides of aluminum, oxides of aluminum, hydroxides of silicon and oxides of silicon. Further, in order to improve various properties of the obtained magnetic recording medium such as light transmittance, surface resistivity, mechanical strength, surface smoothness and durability, the non-magnetic particles may contain, if required, Al, Ti, Zr, Mn, Sn, Sb, etc., therewithin.

The non-magnetic particles may have a granular shape such as a spherical shape, a granular shape, an octahedral shape, a hexahedral shape and a polyhedral shape; an acicular shape such as a needle-like shape, a spindle shape and a rice-grain shape; or a plate shape. In the consideration of a good surface smoothness of the resultant magnetic recording medium, the non-magnetic particles suitably have an acicular shape.

The non-magnetic particles have an average particle diameter of usually 0.01 to 0.3 μm. The non-magnetic particles having an acicular shape have an aspect ratio (average major axis diameter/average minor axis diameter) of usually 2:1 to 20:1, and the non-magnetic particles having a plate shape have an plate ratio (average plate surface diameter/average thickness) of usually 2:1 to 50:1.

As the binder resin contained in the non-magnetic undercoat layer, there may be used the same binder resins as used for forming the magnetic recording layer. The blending ratio between the non-magnetic particles and the binder resin in the non-magnetic undercoat layer may be controlled such that the non-magnetic particles are contained in an amount of usually 5 to 2000 parts by weight based on 100 parts by weight of the binder resin.

Meanwhile, the thus formed non-magnetic undercoat layer may also contain, if required, known additives used in ordinary magnetic recording media such as lubricants, abrasives and antistatic agents in an amount of usually 0.1 to 50 parts by weight based on 100 parts by weight of the binder resin.

The magnetic recording medium provided with the non-magnetic undercoat layer according to the present invention has substantially the same properties as those of the magnetic recording medium provided with no non-magnetic undercoat layer. Especially, the magnetic recording medium having the non-magnetic undercoat layer according to the present invention can be more readily surface-smoothened by calendar treatment, and can be improved in running durability since the lubricant is supplied to the surface thereof from the non-magnetic undercoat layer.

EFFECT OF THE INVENTION

According to the present invention, the spinel-type ferrimagnetic particles can exhibit a high coercive force, an excellent dispersibility and an excellent chemical stability nevertheless an average particle diameter thereof is as small as 5 to 30 nm. Further, since the amount of soluble salts contained in the spinel-type ferrimagnetic particles is minimized, deposition of undesired compounds derived from the soluble salts on the magnetic recording medium, can be effectively prevented. In addition, according to the present invention, it is possible to obtain a magnetic recording medium for high-density recording which exhibits not only excellent frequency characteristics and high output characteristics but also excellent weather resistance and keeping property.

EXAMPLES

The present invention is described in more detail by Examples and Comparative Examples, but the Examples are only illustrative and, therefore, not intended to limit the scope of the present invention.

Various properties of the spinel-type ferrimagnetic particles and magnetic recording media obtained the following Examples and Comparative Examples were measured by the following methods.

(1) The average diameter of the spinel-type ferrimagnetic particles was expressed by an average value of the diameters measured from a transmission electron micrograph thereof. Also, the particle shape of the spinel-type ferrimagnetic particles was determined from the transmission electron micrograph.

(2) The contents of Fe, Co, Ni, Mn, Si, Al, P, Zn, Na, Ca and other metal elements contained in the spinel-type ferrimagnetic particles of the present invention, were measured using an inductively coupled high-frequency plasma atomic emission spectroscope "SPS-4000" (tradename) manufactured by Seiko Denshi Kogyo Co., Ltd.

(3) The amount of the coating composed of a hydroxide of at least one metal selected from the group consisting of Si, Al, P and Zn was measured by a transmission electron microscope (TEM) manufactured by Nippon Denshi Co., Ltd.

(4) The amount of residual sulfur contained in the spinel-type ferrimagnetic particles was measured by "Carbon and Sulfur Measuring Apparatus" manufactured by Horiba Co., Ltd.

(5) The content of the superparamagnetic component was measured by a Moessbauer-spectrum measuring method using a Moessbauer spectroscopic apparatus manufactured by Toboronix Co, Ltd.

(6) The BET specific surface area value was expressed by the value measured by BET method using "Monosorb MS-11" (tradename) manufactured by Quantachrom Co., Ltd.

(7) The solution conductivity was measured using a conductivity meter "DS-12" (tradename) manufactured by Horiba Co., Ltd.

(8) The magnetic properties of the spinel-type ferrimagnetic particles as well as those of a magnetic sheet and a magnetic tape were measured using a vibration sample magnetometer "VSM-3S-15 (tradename)" manufactured by Toei Kogyo Co., Ltd., by applying an external magnetic field of 795.8 kA/m (10 kOe) thereto.

Meanwhile, the magnetic sheet was produced by the following method.

<Production of Magnetic Sheet>

The magnetic sheet was produced as follows. That is, the respective components shown Table 1 below were charged into a 100 ml plastic bottle, and then mixed and dispersed for 8 hours using a paint shaker (manufactured by Reddevil Co., Ltd.), thereby preparing a magnetic coating composition. The thus prepared magnetic coating composition was coated on a 25 μm-thick polyethylene telephthalate film using an applicator to form a coating layer having a thickness of 50 μm thereon. The obtained coating film was then dried in a magnetic field of 500 mT (5 kGauss), thereby obtaining a magnetic sheet.

TABLE 1

| | |
|---|---|
| 3 mmφ steel balls | 800 parts by weight |
| Spinel-type ferrimagnetic Particles | 100 parts by weight |
| Polyurethane resin containing sodium sulfonate groups | 20 parts by weight |
| Cyclohexanone | 83.3 parts by weight |
| Methyl ethyl ketone | 83.3 parts by weight |
| Toluene | 83.3 parts by weight |

(9) The surface roughness Ra of the magnetic tape was determined by measuring a center-line average roughness thereof using a tracer-type surface roughness meter "SURF-COM-575A" (tradename) manufactured by Tokyo Seimitsu Co., Ltd.

Example 1

Production of Spinel-Type Ferrimagnetic Particles

Ferric chloride hexahydrate, cobalt chloride hexahydrate, nickel chloride hexahydrate and manganese chloride tetrahydrate as metal salts were respectively dissolved in pure water in a 10 L resin beaker, thereby preparing 10 L of each of an aqueous solution containing 0.225 mol/L of $Fe^{3+}$, an aqueous solution containing 0.10 mol/L of $Co^{2+}$, an aqueous solution containing 0.08 mol/L of $Ni^2$ and an aqueous solution containing 0.02 mol/L of $Mn^{2+}$. Then, a 20 L resin container equipped with a stirrer and a thermometer was charged with 4 L of the $Fe^{3+}$-containing aqueous solution, 2 L of the $Co^{2+}$-containing aqueous solution, 2 L of the $Ni^{2+}$-containing aqueous solution and 2 L of the $Mn^{2+}$-containing aqueous solution to prepare 10 L of a mixed aqueous solution having a molar ratio (Fe/Co+Ni+Mn) of 2.25. The thus obtained mixed aqueous solution was heated to 50° C. while fully stirring (solution A). Next, 7.2 L of a 1.0 mol/L sodium hydroxide aqueous solution (solution B) was charged into a 30 L stainless steel reaction vessel, and then heated to 95° C. while stirring. The above-prepared solution A was charged while stirring into the aqueous sodium hydroxide solution to conduct a neutralization reaction thereof, thereby obtaining blackish brown precipitation slurry at 69° C.

Then, the thus obtained blackish brown precipitation slurry (co-precipitate-containing slurry) was heat-treated at 95° C. for 120° C. while stirring to subject the mixed metal precipitate to polycondensation reaction, thereby obtaining black particles. A part of a slurry of the obtained black particles was sampled and filtered. The resultant filtrate was subjected to measurement of a concentration of excessive alkali contained therein (alkali concentration). As a result, it was confirmed that the alkali concentration was 0.21 N. Further, the obtained precipitate (black particles) was dried and then subjected to elemental analysis using an inductively coupled high-frequency plasma atomic emission spectroscope. As a result, it was confirmed that the content of Fe in the black particles was 46.5% by mass, the content of Co in the black particles was 10.33% by mass, the content of Ni in the black particles was 8.69% by mass and the content of Mn in the black particles was 2.03% by mass. Therefore, when the composition of the black particles was expressed by $(CoO)_x(NiO)_y(MnO)_z \cdot n/2 (Fe_2O_3)$, it was determined that the molar ratio (n=Fe/M) was 2.25, and x was 0.500, y was 0.400 was 0.100. The BET specific surface area of the obtained black particles was 95.8 $m^2/g$. In addition, as a result of measuring magnetic properties of the black particles using a vibration sample magnetometer (VSM), it was confirmed that the black particles had a coercive force of 179.0 kA/m (2250 Oe), a saturation magnetization vale σs of 52.1 Amt/kg (52.1 emu/g) and a squareness of 0.525.

17 L of the thus obtained slurry of the black particles were transferred into a 100 L resin container, and then repeatedly washed by a decantation method 5 times every 12 hours. As a result, it was confirmed that the slurry of the black particles had a solution conductivity of 400 μS and a pH value of 10.8.

0.51 L of a 10% by mass sulfuric acid solution was added to 15 L of the thus obtained washed slurry of the black particles at 20° C. while stirring, thereby subjecting the black particles to acid-etching treatment at 20° C. for 5 hours.

The resultant slurry of the acid-etched black particles was repeatedly washed by a decantation method 5 times every 12 hours. As a result, it was confirmed that the obtained slurry of the black particles had a pH value of 5.8. A part of the slurry of the black particles was sampled and then filtered. The thus obtained precipitate was subjected to elemental analysis using an inductively coupled high-frequency plasma atomic emission spectroscope. As a result, it was confirmed that the content of Fe in the precipitate was 46.6% by mass, the content of Co in the precipitate was 11.05% by mass, the content of Ni in the precipitate was 7.98% by mass and the content of Mn in the precipitate was 2.13% by mass. Therefore, when the composition of the black particles was expressed by $(CoO)_x(NiO)_y(MnO)_z \cdot n/2(Fe_2O_3)$, it was determined that the molar ratio (n=Fe/M) was 2.30, and x was 0.518, y was 0.375 and z was 0.107. The BET specific surface area of the obtained black particles was 55.4 $m^2/g$. In addition, as a result of measuring magnetic properties of the black particles using a vibration sample magnetometer (VSM), it was confirmed that the black particles had a coercive force of 181.4 kA/m (2280 Oe), a saturation magnetization vale σs of 62.7 Amt/kg (62.7 emu/g) and a squareness of 0.527.

Into the obtained black particles was dropped 0.3 L of an aqueous solution containing aluminum sulfate octahydrate in an amount corresponding to 3% by mass per a solid content in the slurry, at 20° C. for one hour. The dropping procedure was conducted while controlling a pH value of the slurry of the black particles to 9.2 by adding a 0.5N sodium hydroxide solution thereto.

After the slurry was held at 20° C. while stirring for one hour, the resultant slurry of the black particles was repeatedly washed by a decantation method 5 times every 12 hours. Then, the slurry of the black particles having a solution conductivity of 100 μS was subjected to suction filtration using a Nutsche, and then the resultant filter cake was dried at 60° C. for 12 hours.

As a result of X-ray diffraction measurement, it was confirmed that the obtained black particles had a spinel-type structure. Also, as a result of observation using a transmission electron microscope (TEM), it was confirmed that the black particles were particles having an average particle diameter of 19 nm and a uniform particle size distribution. The BET specific surface area of the black particles was 57.3 m$^2$/g. Also, as a result of Moessbauer spectrum measurement, it was confirmed that the black particles contained substantially no superparamagnetic component (not more than 1% by mass). In addition, as a result of measuring magnetic properties of the black particles using a vibration sample magnetometer (VSM), it was confirmed that the black particles had a coercive force of 183.1 kA/m (2300 Oe), a saturation magnetization vale as of 62 Amt/kg (62 emu/g) and a squareness of 0.555.

As a result of elemental analysis of the obtained black particles using an inductively coupled high-frequency plasma atomic emission spectroscope, it was confirmed that the content of Fe in the black particles was 46.1% by mass, the content of Co in the black particles was 10.94% by mass, the content of Ni in the black particles was 7.90% by mass, the content of Mn in the black particles was 2.11% by mass, and the content of Al in the black particles was 0.34% by mass. Therefore, when the composition of the black particles was expressed by $(CoO)_x(NiO)_y(MnO)_z \cdot n/2(Fe_2O_3)$, it was determined that the molar ratio (n=Fe/M) was 2.30, and x 0.517 was, y was 0.375 and z was 0.107. Further, it was confirmed that the black particles had a soluble Na content of 45 ppm, a soluble Ca content of 23 ppm and a residual sulfur content of 98 ppm.

In addition, it was confirmed that a magnetic coating film produced using the thus obtained spinel-type ferrimagnetic particles had a coercive force Hc of 187.8 kA/m (2360 Oe) and a squareness (Br/Bm) of 0.585.

<Production of Magnetic Tape>

Next, a magnetic tape having a non-magnetic undercoat layer was produced. First, a magnetic coating composition containing the following components shown in Table 2 below was prepared.

TABLE 2

| <Coating composition> | |
|---|---|
| Spinel-type ferrimagnetic particles | 100 parts by weight |
| (Binders) | |
| Vinyl chloride-based copolymer resin "MR104" (tradename: produced by Nippon Zeon Co., Ltd.) | 10 parts by weight |
| Polyurethane-based resin "UR-8200" (tradename: produced by Toyobo Co., Ltd.) | 10 parts by weight |
| α-alumina "AKP-50" (tradename: produced by Sumitomo Chemical Co., Ltd.) | 10 parts by weight |
| Carbon black "3250" (tradename: produced by Mitsubishi Chemical Corporation) | 3 parts by weight |
| (Lubricants) | |
| Myristic acid | 1 part by weight |
| Butyl stearate | 2 parts by weight |

TABLE 2-continued

| <Coating composition> | |
|---|---|
| (Curing agents) | |
| Isocyanate-based curing agent "E-31" (tradename: produced by Takeda Pharmaceutical Company Limited) | 5 parts by weight |
| (Solvents) | |
| Methyl ethyl ketone | 114 parts by weight |
| Toluene | 68 parts by weight |
| Cyclohexanone | 46 parts by weight |

The above spinel-type ferrimagnetic particles, vinyl chloride-based copolymer resin, α-alumina and carbon black were mixed with each other, and then 70 parts by weight of the solvents were added thereto. After kneading the resultant mixture together using a pressure kneader, the obtained kneaded material was diluted by adding 50 parts by weight of the solvents thereto. The obtained dilute mixture was mixed with the urethane-based copolymer resin, and dispersed using a sand mill. Then, the resultant dispersion was mixed with the lubricants and 108 parts by weight of the solvents, and further dispersed and then passed through a filter. Further, the curing agent was added to the resultant filter cake while stirring, thereby obtaining a magnetic coating composition.

Separately, a non-magnetic coating composition containing the following components shown in Table 3 below was prepared.

TABLE 3

| <Non-magnetic coating composition> | |
|---|---|
| Non-magnetic acicular hematite particles (average major axis diameter: 0.16 μm; average minor axis diameter: 0.026 μm; aspect ratio: 6.2:1; BET: 49.1 m$^2$/g; Al content: 3.5% by weight) | 100 parts by weight |
| (Binders) | |
| Vinyl chloride-based copolymer resin "MR104" (tradename, produced by Nippon Zeon Co., Ltd.) | 7.5 parts by weight |
| Polyurethane-based resin "UR-8200" (tradename, produced by Toyobo Co., Ltd.) | 7.5 parts by weight |
| (Lubricants) | |
| Myristic acid | 2.5 part by weight |
| Butyl stearate | 2.5 parts by weight |
| (Curing agents) | |
| Isocyanate-based curing agent "E-31" (tradename, produced by Takeda Pharmaceutical Company Limited) | 5 parts by weight |
| (Solvents) | |
| Methyl ethyl ketone | 93 parts by weight |
| Toluene | 55 parts by weight |
| Cyclohexanone | 36 parts by weight |

The above hematite particles and vinyl chloride-based copolymer resin were mixed with 70 parts by weight of the solvents. After kneading the resultant mixture together using a pressure kneader, the obtained kneaded material was diluted by adding 50 parts by weight of the solvents thereto. The obtained dilute mixture was mixed with the urethane-based copolymer resin, and dispersed using a sand mill. Then, the resultant dispersion was mixed with the lubricants and 64 parts by weight of the solvents, and further dispersed and then passed through a filter. Further, the curing agent was added to the resultant filter cake while stirring, thereby obtaining a non-magnetic coating composition.

A magnetic tape was produced using the thus obtained magnetic coating composition and non-magnetic coating composition by the following method. That is, the non-magnetic coating composition and the magnetic coating composition were simultaneously applied onto a 7 μm-thick polyethylene terephthalate film so as to form a non-magnetic layer and a magnetic layer having thicknesses of 1.1 μm and 0.10 μm, respectively, upon drying. The thus obtained non-magnetic layer and magnetic layer were subjected to orientation treatment using a solenoid magnet, drying treatment, and then surface-smoothening and curing treatment by calendering. Successively, a coating composition for back coat composed of carbon black, a vinyl chloride-based copolymer resin and a polyurethane-based resin was applied onto a back surface of the polyethylene terephthalate film opposite to its surface provided with the non-magnetic layer, and then dried, thereby forming a back coat. Next, the resultant magnetic medium was slit into 8 mm in width, thereby obtaining a magnetic tape.

As a result, it was confirmed that the obtained magnetic tape had a coercive force Hc of 198.1 kA/m (2490 Oe), a squareness (Br/Bm) of 0.615, an orientation degree (OR) of 1.10 and a surface smoothness Ra of 14.5 nm.

Examples 2 to 7, Comparative Example 1 and Reference Examples 1 and 2

The same procedure as defined in Example 1 was conducted except that the production conditions of the spinel-type ferrimagnetic particles were variously changed, thereby obtaining spinel-type ferrimagnetic particles. The essential production conditions are shown in Tables 4 to 9; properties of the obtained co-precipitated particles are shown in Table 10; properties of the acid-etched spinel-type ferrimagnetic particles are shown in Table 11; properties of the finally obtained spinel-type ferrimagnetic particles are shown in Tables 12 to 13; and properties of the magnetic coating film produced using the spinel-type ferrimagnetic particles are shown in Table 14. Meanwhile, as a result of Moessbauer spectrum measurements of the spinel-type ferrimagnetic particles obtained in Examples 2 to 7, it was confirmed that any of the particles contained substantially no superparamagnetic component (not more than 1% by mass).

TABLE 4

| Examples, Comparative Example and Reference Examples | Production conditions (1) of spinel-type ferrimagnetic particles | | |
|---|---|---|---|
| | Kind | Concentration (mol/L) | Amount used (L) |
| Ferric salt solution | | | |
| Example 1 | Iron chloride | 0.225 | 4.0 |
| Example 2 | Iron chloride | 0.225 | 4.4 |
| Example 3 | Iron chloride | 0.500 | 5.0 |
| Example 4 | Iron chloride | 1.000 | 5.0 |
| Example 5 | Iron chloride | 1.000 | 4.0 |
| Example 6 | Iron chloride | 1.000 | 2.75 |
| Example 7 | Iron chloride | 1.000 | 5.0 |
| Comparative Example 1 | Iron chloride | 0.225 | 4.0 |
| Reference Example 1 | Iron chloride | 0.225 | 4.0 |
| Reference Example 2 | Iron chloride | 0.225 | 4.0 |
| Cobalt compound solution | | | |
| Example 1 | Cobalt chloride | 0.1 | 2.0 |
| Example 2 | Cobalt chloride | 0.1 | 2.0 |
| Example 3 | Cobalt chloride | 0.2 | 3.75 |
| Example 4 | Cobalt chloride | 0.4 | 3.38 |
| Example 5 | Cobalt chloride | 0.5 | 2.0 |
| Example 6 | Cobalt chloride | 0.4 | 1.19 |
| Example 7 | Cobalt chloride | 0.4 | 3.38 |
| Comparative Example 1 | Cobalt chloride | 0.1 | 2.0 |
| Reference Example 1 | Cobalt chloride | 0.1 | 2.0 |
| Reference Example 2 | Cobalt chloride | 0.1 | 2.0 |
| Nickel compound solution | | | |
| Example 1 | Nickel chloride | 0.08 | 2.0 |
| Example 2 | Nickel chloride | 0.08 | 2.0 |
| Example 3 | Nickel chloride | 0.20 | 2.63 |
| Example 4 | Nickel chloride | 0.40 | 2.56 |
| Example 5 | Nickel chloride | 0.50 | 1.88 |
| Example 6 | Nickel chloride | 0.40 | 1.56 |
| Example 7 | Nickel chloride | 0.40 | 2.56 |
| Comparative Example 1 | Nickel chloride | 0.08 | 2.0 |
| Reference Example 1 | Nickel chloride | 0.08 | 2.0 |
| Reference Example 2 | Nickel chloride | 0.08 | 1.25 |

TABLE 5

| Examples, Comparative Example and Reference Examples | Production conditions (1) of spinel-type ferrimagnetic particles | | |
|---|---|---|---|
| | Kind | Concentration (mol/L) | Amount used (L) |
| Manganese compound solution | | | |
| Example 1 | Manganese chloride | 0.02 | 2.0 |
| Example 2 | Manganese chloride | 0.02 | 2.0 |
| Example 3 | Manganese chloride | 0.02 | 5.0 |
| Example 4 | Manganese chloride | 0.10 | 1.25 |
| Example 5 | Manganese chloride | 0.10 | 0.60 |
| Example 6 | Manganese chloride | 0.10 | 1.25 |
| Example 7 | Manganese chloride | 0.10 | 1.25 |
| Comparative Example 1 | Manganese chloride | 0.02 | 2.0 |
| Reference Example 1 | Manganese chloride | 0.02 | 2.0 |
| Reference Example 2 | Manganese chloride | 0.02 | 5.0 |
| Aqueous alkali solution | | | |
| Example 1 | NaOH | 1.00 | 7.2 |
| Example 2 | NaOH | 1.00 | 10 |

TABLE 5-continued

| | | | |
|---|---|---|---|
| Example 3 | NaOH | 5.00 | 8.0 |
| Example 4 | NaOH | 10.00 | 8.0 |
| Example 5 | NaOH | 10.00 | 10.0 |
| Example 6 | NaOH | 1.00 | 12.0 |
| Example 7 | KOH | 10.00 | 8.0 |
| Comparative Example 1 | NaOH | 1.00 | 7.2 |
| Reference Example 1 | NaOH | 1.00 | 7.2 |
| Reference Example 2 | NaOH | 1.00 | 7.2 |

| Examples, Comparative Example and Reference Examples | Production conditions (1) of spinel-type ferrimagnetic particles | |
|---|---|---|
| | Metal salt solution (L) | Mixed solution (L) |
| Example 1 | 10.0 | 17.2 |
| Example 2 | 10.4 | 20.4 |
| Example 3 | 13.38 | 21.38 |
| Example 4 | 12.19 | 20.19 |
| Example 5 | 8.48 | 18.48 |
| Example 6 | 6.75 | 18.75 |
| Example 7 | 12.19 | 20.19 |
| Comparative Example 1 | 10.0 | 17.2 |
| Reference Example 1 | 10.0 | 17.2 |
| Reference Example 2 | 12.25 | 19.45 |

TABLE 6

| Examples, Comparative Example and Reference Examples | Production conditions (2) of spinel-type ferrimagnetic particles | | |
|---|---|---|---|
| | Temperature of metal salt mixed solution (°C.) | Temperature of aqueous alkali solution (°C.) | Temperature of mixed solution (°C.) |
| Example 1 | 50 | 95 | 69 |
| Example 2 | 60 | 95 | 73 |
| Example 3 | 60 | 100 | 79 |
| Example 4 | 60 | 100 | 82 |
| Example 5 | 60 | 105 | 89 |
| Example 6 | 56 | 57 | 61 |
| Example 7 | 60 | 102 | 84 |
| Comparative Example 1 | 25 | 25 | 27 |
| Reference Example 1 | 50 | 95 | 69 |
| Reference Example 2 | 50 | 95 | 69 |

| Examples, Comparative Example and Reference Examples | Production conditions (2) of spinel-type ferrimagnetic particles | | | |
|---|---|---|---|---|
| | Alkali concentration in mixed solution (M) | Metal ion concentration in mixed solution (M) | Heat-treating temperature (°C.) | Heat-treating time (Hr) |
| Example 1 | 0.21 | 0.08 | 95 | 120 |
| Example 2 | 0.31 | 0.07 | 95 | 120 |
| Example 3 | 1.40 | 0.15 | 95 | 180 |
| Example 4 | 2.97 | 0.37 | 100 | 240 |
| Example 5 | 4.55 | 0.32 | 95 | 120 |
| Example 6 | 0.07 | 0.21 | 90 | 180 |
| Example 7 | 2.97 | 0.37 | 95 | 60 |
| Comparative Example 1 | 0.21 | 0.08 | 95 | 120 |
| Reference Example 1 | 0.21 | 0.08 | 95 | 120 |
| Reference Example 2 | 0.19 | 0.07 | 95 | 120 |

TABLE 7

| Examples, Comparative Example and Reference Examples | Washing and acid-etching conditions | | |
|---|---|---|---|
| | Number of repetition of decantation | pH after washing (—) | Kind of acid |
| Example 1 | 5 | 10.8 | Sulfuric acid |
| Example 2 | 5 | 11.1 | Sulfuric acid |
| Example 3 | 6 | 11.3 | Sulfuric acid |
| Example 4 | 7 | 10.7 | Sulfuric acid |
| Example 5 | 7 | 10.8 | Sulfuric acid |
| Example 6 | 5 | 10.8 | Sulfuric acid |
| Example 7 | 6 | 11.0 | Oxalic acid |
| Comparative Example 1 | 5 | 10.8 | Sulfuric acid |
| Reference Example 1 | 5 | 10.8 | Sulfuric acid |
| Reference Example 2 | 5 | 10.8 | Sulfuric acid |

| Examples, Comparative Example and Reference Examples | Washing and acid-etching conditions | | |
|---|---|---|---|
| | Amount acid-etched (mol %) | Acid-etching temperature (°C.) | Acid-etching time (Hr) |
| Example 1 | 30.0 | 20.0 | 12.0 |
| Example 2 | 25.0 | 30.0 | 10.0 |
| Example 3 | 40.0 | 40.0 | 15.0 |
| Example 4 | 20.0 | 50.0 | 7.0 |
| Example 5 | 60.0 | 30.0 | 24.0 |
| Example 6 | 30.0 | 20.0 | 24.0 |
| Example 7 | 25.0 | 60.0 | 12.0 |
| Comparative Example 1 | 30.0 | 20.0 | 12.0 |
| Reference Example 1 | 0.0 | — | — |
| Reference Example 2 | 30.0 | 20.0 | 12.0 |

TABLE 8

| Examples, Comparative Example and Reference Examples | Washing and surface-treating conditions | | | |
|---|---|---|---|---|
| | Number of repetition of decantation | pH after washing (—) | Kind of surface-treating material | Amount of surface-treating material (wt %) |
| Example 1 | 5 | 5.8 | Aluminum sulfate octahydrate | 3.0 |
| Example 2 | 5 | 6.0 | Aluminum sulfate octahydrate | 5.0 |
| Example 3 | 6 | 5.9 | Aluminum sulfate octahydrate | 7.0 |
| Example 4 | 5 | 5.8 | Water glass #1 solution | 3.0 |
| Example 5 | 6 | 5.5 | Water glass #1 solution | 3.0 |

TABLE 8-continued

| Examples, Comparative Example and Reference Examples | Washing and surface-treating conditions | | | |
|---|---|---|---|---|
| | Number of repetition of decantation | pH after washing (—) | Kind of surface-treating material | Amount of surface-treating material (wt %) |
| Example 6 | 5 | 5.9 | Aluminum sulfate octahydrate | 10.0 |
| Example 7 | 5 | 6.1 | Aluminum sulfate octahydrate | 3.0 |
| Comparative Example 1 | 5 | 6.2 | Aluminum sulfate octahydrate | 3.0 |
| Reference Example 1 | — | — | Aluminum sulfate octahydrate | 3.0 |
| Reference Example 2 | 5 | 6.0 | Aluminum sulfate octahydrate | 3.0 |

TABLE 9

| Examples, Comparative Example and Reference Examples | Washing and surface-treating conditions | | |
|---|---|---|---|
| | Surface-treating temperature (° C.) | pH value upon surface treatment (—) | Time of addition of treating solution (Hr) |
| Example 1 | 20.0 | 9.2 | 1.0 |
| Example 2 | 20.0 | 9.2 | 1.0 |
| Example 3 | 40.0 | 9.0 | 1.5 |
| Example 4 | 90.0 | 9.2 | 1.0 |
| Example 5 | 95.0 | 9.0 | 1.0 |
| Example 6 | 80.0 | 9.1 | 1.0 |
| Example 7 | 80.0 | 9.2 | 1.0 |
| Comparative Example 1 | 20.0 | 9.2 | 1.0 |
| Reference Example 1 | 20.0 | 9.2 | 1.0 |
| Reference Example 2 | 20.0 | 9.2 | 1.0 |

| Examples, Comparative Example and Reference Examples | Washing and surface-treating conditions | | |
|---|---|---|---|
| | Treating time (Hr) | Drying time (Hr) | Drying temperature (° C.) |
| Example 1 | 1.0 | 12.0 | 60.0 |
| Example 2 | 1.0 | 12.0 | 60.0 |
| Example 3 | 1.0 | 12.0 | 60.0 |
| Example 4 | 2.0 | 12.0 | 60.0 |
| Example 5 | 1.0 | 12.0 | 60.0 |
| Example 6 | 1.0 | 12.0 | 60.0 |
| Example 7 | 1.0 | 12.0 | 60.0 |
| Comparative Example 1 | 1.0 | 12.0 | 60.0 |
| Reference Example 1 | 1.0 | 12.0 | 60.0 |
| Reference Example 2 | 1.0 | 12.0 | 60.0 |

TABLE 10

| Examples, Comparative Example and Reference Examples | Properties of black precipitate | | |
|---|---|---|---|
| | Kind | Particle shape | BET specific surface area (m²/g) |
| Example 1 | Spinel-type | Granular | 95.8 |
| Example 2 | Spinel-type | Granular | 110.3 |
| Example 3 | Spinel-type | Granular | 92.0 |
| Example 4 | Spinel-type | Granular | 98.4 |
| Example 5 | Spinel-type | Granular | 94.5 |
| Example 6 | Spinel-type | Granular | 105.2 |
| Example 7 | Spinel-type | Granular | 103.0 |
| Comparative Example 1 | Spinel-type | Granular | 92.1 |
| Reference Example 1 | Spinel-type | Granular | 95.8 |
| Reference Example 2 | Spinel-type | Granular | 89.9 |

| Examples, Comparative Example and Reference Examples | Properties of black precipitate | | | |
|---|---|---|---|---|
| | Fe content (wt %) | Co content (wt %) | Ni content (wt %) | Mn content (wt %) |
| Example 1 | 46.5 | 10.33 | 8.69 | 2.03 |
| Example 2 | 47.9 | 10.20 | 8.10 | 1.90 |
| Example 3 | 46.0 | 12.13 | 10.16 | 1.81 |
| Example 4 | 46.1 | 13.14 | 9.93 | 1.13 |
| Example 5 | 46.3 | 12.22 | 11.44 | 0.69 |
| Example 6 | 46.8 | 8.53 | 11.18 | 2.51 |
| Example 7 | 46.2 | 13.10 | 9.95 | 1.11 |
| Comparative Example 1 | 45.8 | 10.29 | 8.63 | 1.99 |
| Reference Example 1 | 46.5 | 10.33 | 8.69 | 2.03 |
| Reference Example 2 | 46.8 | 10.97 | 5.47 | 5.11 |

TABLE 11

| Examples, Comparative Example and Reference Examples | Properties of particles after acid-etching treatment | | |
|---|---|---|---|
| | Kind | Particle shape | BET specific surface area (m²/g) |
| Example 1 | Spinel-type | Granular | 55.4 |
| Example 2 | Spinel-type | Granular | 56.3 |
| Example 3 | Spinel-type | Granular | 58.3 |
| Example 4 | Spinel-type | Granular | 54.4 |
| Example 5 | Spinel-type | Granular | 64.8 |
| Example 6 | Spinel-type | Granular | 53.5 |
| Example 7 | Spinel-type | Granular | 57.0 |
| Comparative Example 1 | Spinel-type | Granular | 46.3 |
| Reference Example 1 | Spinel-type | Granular | — |
| Reference Example 2 | Spinel-type | Granular | 64.5 |

| Examples, Comparative Example and Reference Examples | Properties of particles after acid-etching treatment | | | |
|---|---|---|---|---|
| | Fe content (wt %) | Co content (wt %) | Ni content (wt %) | Mn content (wt %) |
| Example 1 | 46.6 | 11.05 | 7.98 | 2.13 |
| Example 2 | 48.0 | 10.60 | 7.70 | 1.91 |
| Example 3 | 46.5 | 11.92 | 8.35 | 1.65 |
| Example 4 | 46.3 | 12.79 | 9.04 | 1.08 |
| Example 5 | 46.7 | 12.60 | 9.12 | 0.64 |

TABLE 11-continued

| | | | | |
|---|---|---|---|---|
| Example 6 | 47.1 | 9.79 | 9.17 | 2.44 |
| Example 7 | 46.0 | 12.82 | 9.09 | 0.99 |
| Comparative Example 1 | 46.5 | 10.95 | 8.02 | 2.11 |
| Reference Example 1 | — | — | — | — |
| Reference Example 2 | 46.9 | 11.37 | 4.61 | 5.54 |

TABLE 12

| Examples, Comparative Example and Reference Examples | Properties of spinel-type ferrimagnetic particles | | |
|---|---|---|---|
| | Kind | Particle shape | Average particle diameter (nm) |
| Example 1 | Spinel-type | Granular | 19.0 |
| Example 2 | Spinel-type | Granular | 18.0 |
| Example 3 | Spinel-type | Granular | 17.0 |
| Example 4 | Spinel-type | Granular | 22.5 |
| Example 5 | Spinel-type | Granular | 15.2 |
| Example 6 | Spinel-type | Granular | 27.9 |
| Example 7 | Spinel-type | Granular | 21.2 |
| Comparative Example 1 | Spinel-type | Granular | 38.4 |
| Reference Example 1 | Spinel-type | Granular | 20.0 |
| Reference Example 2 | Spinel-type | Granular | 15.8 |

| Examples, Comparative Example and Reference Examples | Properties of spinel-type ferrimagnetic particles Composition formula | | | |
|---|---|---|---|---|
| | n | x | y | z |
| Example 1 | 2.30 | 0.518 | 0.375 | 0.107 |
| Example 2 | 2.48 | 0.520 | 0.379 | 0.101 |
| Example 3 | 2.20 | 0.540 | 0.380 | 0.080 |
| Example 4 | 2.10 | 0.550 | 0.390 | 0.060 |
| Example 5 | 2.24 | 0.553 | 0.416 | 0.031 |
| Example 6 | 2.30 | 0.453 | 0.426 | 0.121 |
| Example 7 | 2.11 | 0.558 | 0.396 | 0.046 |
| Comparative Example 1 | 2.31 | 0.515 | 0.379 | 0.106 |
| Reference Example 1 | 2.25 | 0.500 | 0.400 | 0.100 |
| Reference Example 2 | 2.31 | 0.531 | 0.216 | 0.253 |

TABLE 13

| Examples, Comparative Example and Reference Examples | Properties of spinel-type ferrimagnetic particles | |
|---|---|---|
| | BET specific surface area ($m^2/g$) | Amount of surface-coating metal layer (wt %) |
| Example 1 | 57.3 | 0.34 |
| Example 2 | 58.8 | 0.56 |
| Example 3 | 60.3 | 0.77 |
| Example 4 | 57.0 | 0.39 |
| Example 5 | 66.8 | 0.38 |
| Example 6 | 54.2 | 0.98 |
| Example 7 | 56.4 | 0.32 |
| Comparative Example 1 | 47.8 | 0.33 |
| Reference Example 1 | 93.2 | 0.31 |
| Reference Example 2 | 67.2 | 0.34 |

| Example and Reference Examples | Properties of spinel-type ferrimagnetic particles | | |
|---|---|---|---|
| | Sulfur content (ppm) | Soluble Na content (ppm) | Soluble Ca content (ppm) |
| Example 1 | 98 | 45 | 23 |
| Example 2 | 95 | 42 | 22 |
| Example 3 | 85 | 38 | 39 |
| Example 4 | 88 | 49 | 22 |
| Example 5 | 99 | 42 | 38 |
| Example 6 | 77 | 42 | 33 |
| Example 7 | 85 | 22 | 24 |
| Comparative Example 1 | 77 | 40 | 30 |
| Reference Example 1 | 21 | 130 | 48 |
| Reference Example 2 | 95 | 44 | 25 |

TABLE 14

| Examples, Comparative Example and Reference Examples | Properties of magnetic coating film | | |
|---|---|---|---|
| | Coercive force | | Squareness |
| | (kA/m) | (Oe) | (—) |
| Example 1 | 187.8 | 2360 | 0.605 |
| Example 2 | 190.2 | 2390 | 0.610 |
| Example 3 | 249.1 | 3130 | 0.675 |
| Example 4 | 269.8 | 3390 | 0.688 |
| Example 5 | 272.2 | 3420 | 0.683 |
| Example 6 | 167.1 | 2100 | 0.610 |
| Example 7 | 263.4 | 3310 | 0.680 |
| Comparative Example 1 | 316.7 | 3980 | 0.672 |
| Reference Example 1 | 180.6 | 2270 | 0.531 |
| Reference Example 2 | 85.9 | 1080 | 0.540 |

TABLE 15

| Examples and Reference Example | Properties of magnetic tape | | | | |
|---|---|---|---|---|---|
| | Coercive force | | Squareness | Orientation degree | Surface roughness |
| | (kA/m) | (Oe) | (—) | (—) | (nm) |
| Example 1 | 198.2 | 2490 | 0.610 | 1.10 | 14.5 |
| Example 4 | 270.6 | 3400 | 0.690 | 1.15 | 14.8 |
| Example 7 | 263.4 | 3310 | 0.677 | 1.16 | 13.7 |
| Reference Example 1 | 179.9 | 2260 | 0.533 | 1.04 | 23.5 |

Next, the same procedure as defined in Example 1 was conducted except that the spinel-type ferrimagnetic particles were changed variously, thereby producing a magnetic tape. Various properties of the magnetic tapes obtained in Examples 1, 4 and 7 and Reference Example 1 are shown in Table 15.

What is claimed is:

1. A process for producing coated spinel-type ferrimagnetic particles having a composition represented by the formula:

$$(MO) \cdot n/2(Fe_2O_3)$$

wherein M is a divalent metal; and n is a molar ratio of Fe to M, n=Fe/M,
which is from more than 2.05 to less than 2.5, 2.05<n<2.5, the particles containing a superparamagnetic component in an amount of not more than 2% by mass, and having an average particle diameter of 5 to 30 nm,
said spinel-type ferrimagnetic particles being respectively coated on a surface thereof with an hydroxide of at least one metal selected from the group consisting of Si, Al, P and Zn,
the metal hydroxide coated on the spinel-type ferrimagnetic particles is present in an amount of not more than 10% by mass, calculated as the metal based on the weight of ferrimagnetic particles, the process comprising the steps of:
a preparation step for a raw aqueous solution of mixing an aqueous iron (Fe)-containing solution and an aqueous divalent metal (M)-containing solution with each other such that a molar ratio of Fe to M is in the range of from more than 2.05 to less than 2.5, 2.05<Fe/M<2.5;
a production step for a co-precipitate-containing solution of adding an aqueous alkali solution to the raw aqueous solution at a temperature of from 60° C. to less than 110° C. so as to adjust a concentration of alkali in the raw aqueous solution to 0.05 to 10 M;
a production step for black particles of heat-treating the co-precipitate-containing solution at a temperature of 80 to 120° C.;
an etching step for the black particles of washing the black particles to remove the alkali therefrom, and adding an acid thereto to remove a superparamagnetic component therefrom; and
a coating step for a hydroxide of the metal of subjecting the resultant solution containing the etched black particles to filtration and washing, and then adding an aqueous solution containing at least one metal selected from the group consisting of Si, Al, P and Zn to the resultant solution containing the washed black particles.

2. The process according to claim 1, wherein M is at least two metals selected from the group consisting of Co, Ni, Zn and Mn.

3. The process according to claim 1, wherein the produced spinel-type ferrimagnetic particles have a coercive force of 159.2 to 318.4 kA/m, 2000 to 4000 Oe, and a saturation magnetization value σs of 40 to 70 Am²/kg, 40 to 70 emu/g.

4. The process according to claim 1, wherein the produced spinel-type ferrimagnetic particles have a soluble Na content of not more than 100 ppm and a soluble Ca content of not more than 100 ppm.

5. The process according to claim 1, wherein the produced spinel-type ferrimagnetic particles have a composition represented by the formula:

$$(CoO)_x(NiO)_y(MnO)_z \cdot n/2(Fe_2O_3)$$

wherein n is a molar ratio of Fe to M, n=Fe/M, which is from more than 2.05 to less than 2.5, 2.05<n<2.5; x is a number of from more than 0.4 to less than 0.6, 0.4<x<0.6; y is a number of from more than 0.3 to less than 0.5, 0.3<y<0.5; and z is a number of from more than 0.02 to less than 0.2, 0.02<z<0.2, with the proviso that a sum of x, y and z is 1, x+Y+z =1.

6. The process according to claim 1, wherein the produced particles have a soluble Na content of not more than 49 ppm.

* * * * *